United States Patent [19]

Asawa

[11] Patent Number: 4,637,683
[45] Date of Patent: Jan. 20, 1987

[54] METHOD FOR ALIGNING OPTICAL FIBER CONNECTORS

[75] Inventor: Charles K. Asawa, Pacific Palisades, Calif.

[73] Assignee: TRW Inc., Redondo Beach, Calif.

[21] Appl. No.: 695,516

[22] Filed: Jan. 28, 1985

[51] Int. Cl.$^4$ .............................................. G02B 6/32
[52] U.S. Cl. .................. 350/96.18; 350/320; 356/138
[58] Field of Search .................. 350/320, 96.15, 96.18, 350/96.19, 96.20, 96.21; 356/73.1, 138, 153, 150

[56] References Cited

U.S. PATENT DOCUMENTS

| | | | |
|---|---|---|---|
| 3,829,195 | 8/1974 | Rawson | 350/96.18 |
| 4,290,667 | 9/1981 | Chown | 350/96.2 X |
| 4,509,827 | 4/1985 | Cowen et al. | 350/96.2 X |

FOREIGN PATENT DOCUMENTS

| | | | |
|---|---|---|---|
| 2456293 | 6/1976 | Fed. Rep. of Germany | 356/73.1 |
| 2841133 | 4/1980 | Fed. Rep. of Germany | 350/96.15 |

OTHER PUBLICATIONS

Webster's Seventh New Collegiate Dictionary, Mass., G. & C. Merriam Co., 1971, "Interferometer".

Primary Examiner—John Lee
Assistant Examiner—L. Rushin
Attorney, Agent, or Firm—Noel F. Heal; Robert J. Stern

[57] ABSTRACT

A method for alignment of optical fiber connector halves, including the steps of securing a connector lens in a lens holder having a planar end face, forming a reference plane parallel to or coplanar with the planar face of the lens holder, and then positioning an optical fiber such that, if the reference plane is reflective, light launched into the lens from the fiber will be maximally reflected back into the fiber. In one disclosed embodiment of the invention, the lens holder planar surface and an end surface of the lens are ground and polished together to form a common reference plane. Three alternative approaches are disclosed for detecting light reflected back into the fiber. The first approach detects light in the fiber core by means of a beam-splitting mirror. The second approach relies on the detection of light in the fiber cladding material, which is minimized when the fiber is properly aligned with the lens. The third approach relies on a charge in the laser spectral and noise output when the fiber is properly aligned with the lens.

10 Claims, 18 Drawing Figures

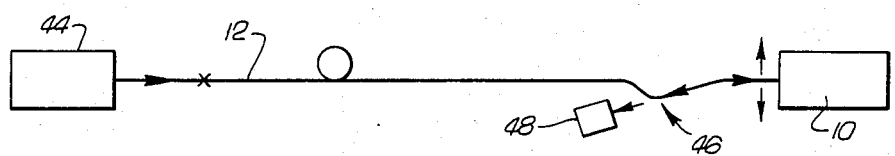
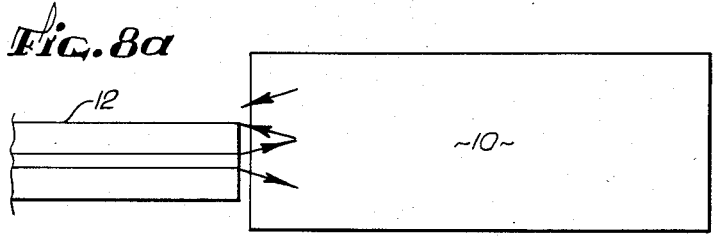
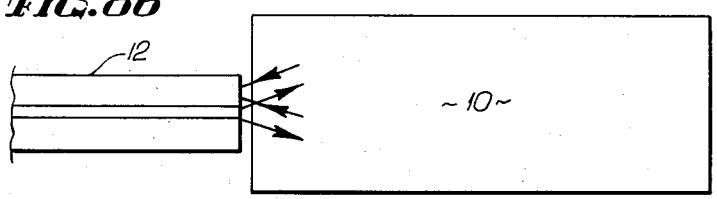
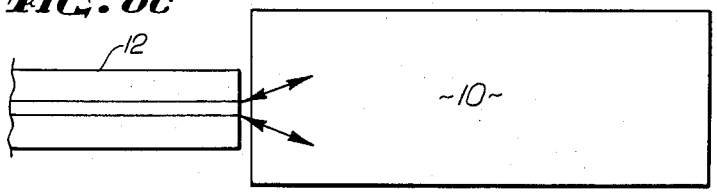
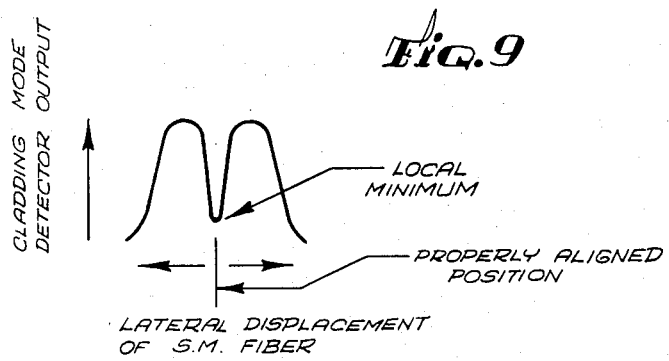

METHOD FOR ALIGNING OPTICAL FIBER CONNECTORS

BACKGROUND OF THE INVENTION

This invention relates generally to connectors for optical fibers, and more particularly, to methods for aligning single-mode and multi-mode optical fibers using graded refractive index (GRIN) lenses. The need for optical fiber connectors in optical fiber communication systems and other applications has long been apparent. Ideally connectors should present only a minimal loss in the fiber transmission medium.

The principal causes of loss in all fiber optical connectors are angular and spatial misalignment. These alignment problems are particularly acute for single-mode fiber connectors, which have extremely small dimensional tolerances. In order to butt-couple two single-mode fibers with less than 0.1 decibel (dB) loss, the fiber cores must be aligned to a precision of less than one micron ($1 \times 10^{-6}$ meter).

One approach to the alignment of single-mode fibers is to employ a graded refractive index lens on each side of the connector, and to butt the lenses together instead of the fibers themselves. Commercially available lenses for this purpose are sold under the name SELFOC lenses. (SELFOC is a registered trademark of Nippon Sheet Glass Co.) These lenses will be referred to in this specification as graded refractive index lenses, or GRIN lenses.

A quarter-pitch GRIN lens functions analogously to a collimating lens. The refractive index of the lens material varies across its cross section in such a manner as to expand a very small source of light, emerging from a single-mode fiber, into a much broader, parallel beam. If a second quarter-pitch GRIN lens is placed adjacent to the first one, the parallel beam is focused down to almost a point focus, for launching into a single-mode fiber in the second connector half. This approach has the advantage of greatly reducing the requirements for lateral alignment of the fibers, i.e. the required tolerance for lateral fiber alignment is greater. However, the use of connector lenses requires extreme precision of angular alignment. For a connector loss of 0.1 dB, the angular alignment tolerance is 0.0003 radians, or approximately one minute of arc (1/60 of a degree). Therefore, the GRIN lens connector approach trades dimensional alignment-tolerance for angular alignment tolerance, and there is, therefore, a need for an accurate and convenient method of angular alignment of the connector lenses.

One cannot rely on precision manufacture of the GRIN lenses, since not all such lenses are perfect plane cylinders, and losses or part wastage will inevitably result. In the past, techniques for assuring precision in the connector halves have relied on there being a near-perfect "master" parallel beam, generated either from a perfect connector half or from a separate source. The procedure typically used is to align and orient each manufactured connector half with the parallel beam. This may not always be possible for some lens components, and can still lead to wastage. The fiber is then positioned and attached to the lens, and in theory any two connector halves that have been matched to the master parallel beam will be perfectly matched to each other.

Unfortunately, these prior-art techniques have not always worked in practice, and there is a need for an alternative approach to angular alignment of GRIN lens connector halves. The present invention is directed to this end.

SUMMARY OF THE INVENTION

The present invention resides in a novel method for alignment of lens-type optical fiber connectors. Briefly, and in general terms, the steps of the method include securing each lens in a holder with one of its end faces exposed, forming a common reference plane by grinding and polishing the exposed end face of the lens together with the adjacent surface of the holder, and positioning an optical fiber at the other end face of the lens in such a manner that light rays from the fiber have a perpendicular angle of incidence with the reference plane.

Any two connector halves made by this method will then be perfectly angularly aligned if their reference planes are butted together or placed in a parallel relationship. Even if one of the lenses is not perfectly cylindrical, and has an end face not perpendicular to its axis, the alignment technique of the invention will ensure that light rays from the fiber will be incident perpendicularly on the reference plane, which is the end face of the lens. So long as the mating lens is similarly aligned, the two halves will be perfectly matched, even though one them may be imperfect from a manufacturing standpoint. No standard connector or master parallel beam is required, and the method results in a minimum wastage of components, while still ensuring that any two connector halves will have near perfect angular alignment.

Lateral alignment of the connector halves can be achieved by any conventional technique, such as by means of dowel pins and corresponding holes in the lens holders. The halves may be butted together or spaced apart by a precision shim, depending on the particular application.

Any of several alternative approaches may be used to position the fiber with respect to the lens. In one approach, the positioning step includes coating the reference plane with a reflective material, launching light into the fiber, measuring the intensity of light reflected back along the fiber by the reflective coating, and moving the fiber with respect to the lens until the intensity of light found in the measuring step is at a maximum. More specifically, the step of measuring the reflected light intensity includes interposing a semireflective mirror in the reflected beam, and detecting the intensity of the reflected beam, wherein the semireflective mirror transmits light in the forward direction toward the connector.

This direct approach to measuring the intensity of the reflected light has the disadvantage that it requires that the optical fiber both between the source of light and the connector be interrupted by the semireflective mirror and a detector. An alternative approach that avoids this problem includes the steps of bending the fiber slightly, detecting light emanating from the fiber cladding material at the position of the bend, and moving the fiber with respect to the lens until a local minimum is detected by the detecting step, this being indicative maximum light reflection into the core of the fiber, and minimum reflection into the adjacent cladding material.

In some instances, the lens will be slightly shorter than a true quarter-pitch lens, i.e. its focal point will not be exactly at the end face of the lens, but rather will be spaced out from the end face. Accordingly, the positioning step may include the steps of positioning the fiber laterally with respect to the lens, and positioning the fiber axially with respect to the lens.

Proper alignment of the fiber to the GRIN lens can be accomplished by observing the change in the laser source spectrum as the light is reflected back or fed back to the laser. The laser output is observed by placing a partially reflecting, partially transmitting coating on the GRIN lens surface. The transmitted laser light is examined for a changed spectrum to indicate proper alignment of the fiber to the GRIN lens. An advantage of this method is that very long lengths of fiber may be attached to the connector.

It will be appreciated from the foregoing that the present invention represents a significant advance in the field of optical fiber connectors. In particular, the invention provides an improved technique for angularly aligning GRIN lenses used as connecting elements for optical fibers, especially single-mode fibers having extremely small dimensions. Other aspects and advantages of the invention will become apparent from the following more detailed description, taken in conjunction with the accompanying drawings.

BRIEF DESCRIPTION OF THE DRAWINGS

FIG. 7 is a schematic view showing an alternative technique for alignment of a fiber and a GRIN lens assembly;

FIGS. 8a–8c are schematic views illustrating the degree of reflection back into a fiber depending on the position of the fiber with respect to the lens, with FIG. 8a showing the fiber much too low, FIG. 8b showing the fiber slightly too low, and FIG. 8c showing the fiber properly aligned;

FIG. 9 is a graph showing the detected output of light from the fiber cladding for various fiber lateral displacements;

DESCRIPTION OF THE PREFERRED EMBODIMENTS

Figure 1:
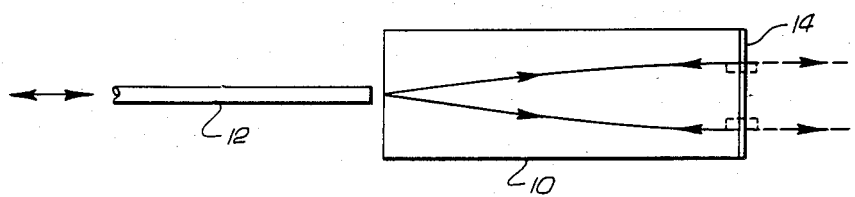
FIG. 1 is a schematic view of an optical fiber and a GRIN connector lens angularly aligned with the fiber to provide an output beam perpendicular to the lens surface.

As shown in the drawings for purposes of illustration, the present invention is concerned with techniques for the fabrication and alignment of graduated refractive index (GRIN) lenses and optical fibers, for use in optical fiber connectors. As discussed above, the production of perfectly matched lens-type fiber connectors has posed some practical difficulties, especially for very small single-mode fibers.

In accordance with the invention, each connector half is made by first forming a reference plane that will be perpendicular to light emerging from the connector half. If both connector halves are made in the same manner, there will be practically perfect angular alignment between the halves.

Figure 2:
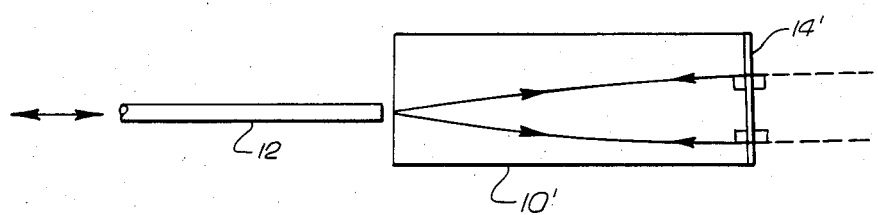
FIG. 2 is a schematic view similar to FIG. 1, but showing in imperfect GRIN lens.

This principle is shown diagrammatically in FIGS. 1 and 2. A GRIN lens, indicated by reference numeral 10 and an associated fiber 12 are shown in FIG. 1 as being aligned in such a manner that light from the fiber is incident perpendicularly on end surface 14 of the lens. The end surface 14 is the reference plane. If the surface 14 is mirrored, light will be reflected from it back along identical paths, and will be launched back into the fiber 12. If the reflective material on the surface 14 is not present, light will emerge from the lens 10 perpendicularly to the reference plane 14. When two such connector halves are butted together, they will therefor be in perfect alignment.

FIG. 2 shows the effect of an imperfect GRIN lens, indicated at 10'. The reference plane 14' is not perpendicular to the longitudinal axis of the cylindrical lens 10'. However, if the fiber 12 is appropriately positioned to recapture light reflected from the surface 14' when coated with reflective material, light will still emerge from the uncoated surface 14' along paths that are perpendicular to the surface. Thus, when the imperfect lens is coupled to a perfect one, such as the one in FIG. 1, there will still be perfect alignment of the coupling halves. This is the basis for the alignment technique of the invention.

Figure 3:
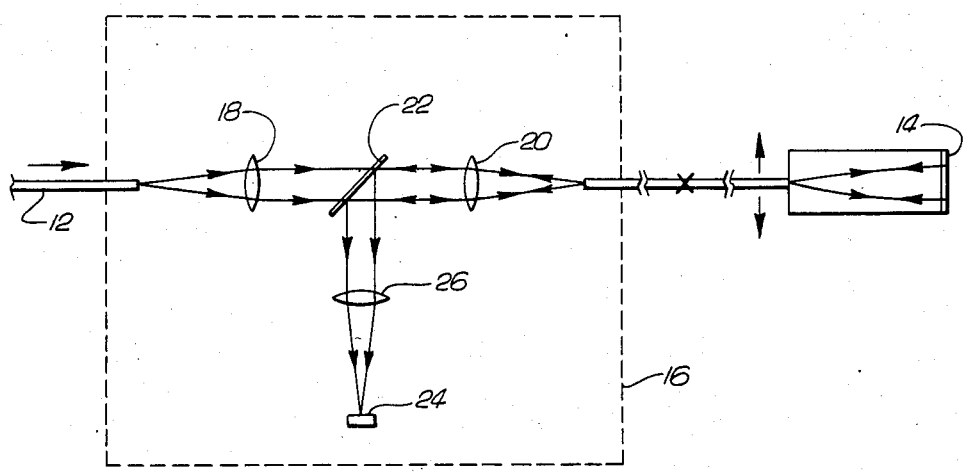
FIG. 3 is a schematic diagram showing a technique for aligning a fiber to a GRIN lens.

FIG. 3 shows one approach for aligning the fiber 12 with the lens 10 to ensure the desired perpendicular orientation of the emerging light beam with respect to the reference plane 14. The fiber 12 is passed through a detector apparatus 16, which includes a pair of lenses 18 and 20, a beam-splitting mirror 22 and a light detector 24. Light from a light source (not shown) emerges from the fiber 12 in the apparatus 16 and is collimated by the lens 18. The collimated beam impinges on the beam splitting mirror 22, and a transmitted portion of the light is focused by the other lens 20 into a continuing section of the fiber 12, which is positioned for launching the light into the lens 10. Reflected light from the lens 10 passes through the fiber 12, through the lens 20 and is reflected, in part, by the mirror 22. Another lens 26 is used to focus this reflected light into the light detector 24. Alignment of the fiber 12 and the lens 10 is achieved by moving the fiber laterally and axially with respect to the lens, as will be later described, until the detector output is maximized. Then the fiber 12 is permanently affixed to the lens 10 and the reflective coating on the lens is removed.

Figure 4:
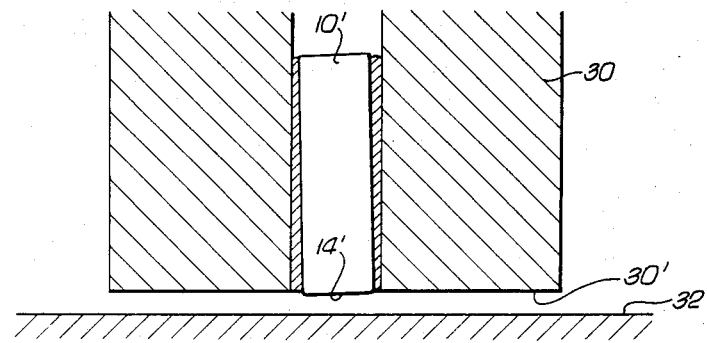
FIG. 4 is a cross-sectional view of a GRIN lens and a lens holder prior to grinding and polishing a reference plane surface.
Figure 5:
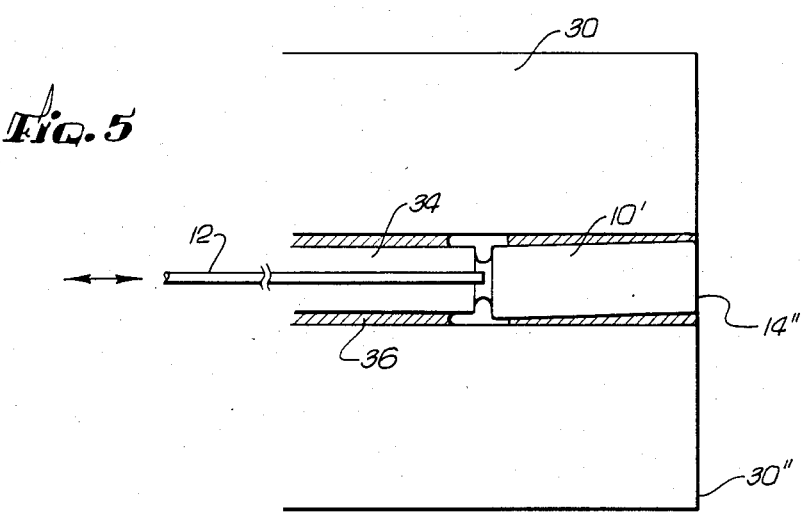
FIG. 5 is a cross-sectional view of a GRIN lens and lens holder assembly used in the alignment technique of the invention.

If a pair of connector halves are to be properly aligned an matched, it will be necessary to ensure that the reference plane of each connector half is properly aligned with the mechanical support coupling half. As shown in FIG. 4, an imperfect lens 10' is imperfectly attached to a connector part 30. The connector part 30 is also cylindrical, and has a central hole for installation of the lens 10'. In spite of the lens imperfections, the technique of the invention still results in perfect matching of connector halves. The lens 10' and the connector part or holder 30 are together subject to grinding and polishing on a plane surface, as indicated by the polishing and grinding surface 32. Surface 30' of the holder and the surface 14 of the GRIN lens are rendered coplanar by the grinding and polishing on surface 32. The resulting coplanar surface is indicated by 30'' and 14'' of FIG. 5 and forms the reference plane for the connector. FIG. 5 also shows the assembly of lens and holder again, with the fiber 12 positioned in a fiber holder 34. There may be a quantity of index-matching cement between the end of the fiber 12 and the lens 10'. The fiber holder 34 is also cemented in place, as indicated at 36, after alignment with the lens 10'.

Figure 6:
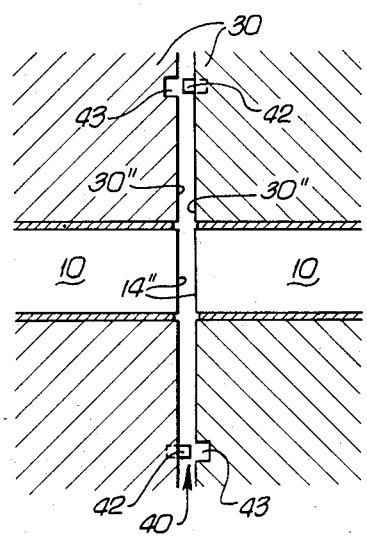
FIG. 6 is a fragmentary cross-sectional view of a pair of connector halves formed in accordance with the invention.

FIG. 6 is a fragmentary view of two coupled connector halves, including the connector parts 30 and the GRIN lens 10. As indicated at 40, there is a space between the two connector halves. This may be filled by a precision spacer, or the two halves may be butted together, depending on the application of the connector and the fibers. Since lateral alignment of the connector halves is not extremely critical when GRIN lenses are used, appropriate alignment may be attained by means of matching dowel pins and holes, indicated at 42 and 43, respectively, in the connector parts 30. Ideally, the matching dowel pins and holes are arranged in such a manner that all of the connector halves are identical, and any two connector halve are, therefore, connectable.

FIG. 7 illustrates an alternative technique for the alignment of the fiber 12 with respect to the lens 10. In contrast to the technique using the detector apparatus 16 shown in FIG. 3, in this approach the fiber 12 does not have to be interrupted between the light source 44 and the lens 10. Instead, the fiber 12 is slightly bent, as indicated at 46, and a detector 48 is employed to detect light emerging from the cladding of the fiber at the area of the bend 46. FIGS. 8a–8c illustrate the effect of lateral movement of the fiber 12 with respect to the lens 10. In FIG. 8a, the fiber is much too low to receive reflected light, and much of the reflected light misses the fiber altogether. Consequently, there is little reflected light launched into either the fiber core or the fiber cladding material. In FIG. 8b, the fiber 12 is still slightly low, but some light is launched into the cladding, and is detectable at the detector 48. Finally, as shown in FIG. 8c, if the fiber 12 is correctly positioned with respect to the lens, almost all of the light reflected from the reference plane surface 14 will be launched into the fiber core, and very little will be launched into the cladding. Accordingly, as shown in the graph of FIG. 9, lateral movement of the fiber 12 will produce a local minimum in the detected output from the cladding light detector 48. When this local minimum is detected, the fiber 12 can be cemented in place as in the first-described technique.

Figure 10A:
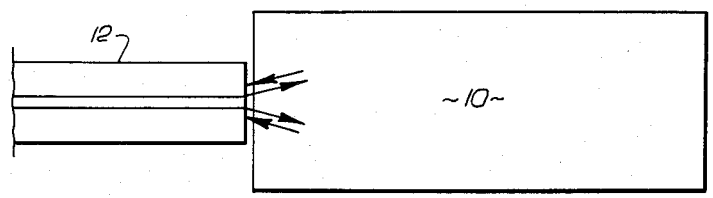
FIGS. 10a–10c are schematic views illustrating the degree of reflection of light back into the fiber cladding depending on the axial position of the fiber with respect to the lens.
Figure 10B:
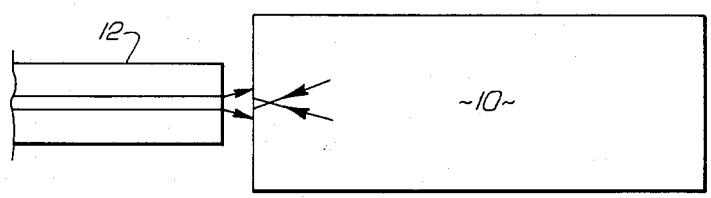
Figure 10C:
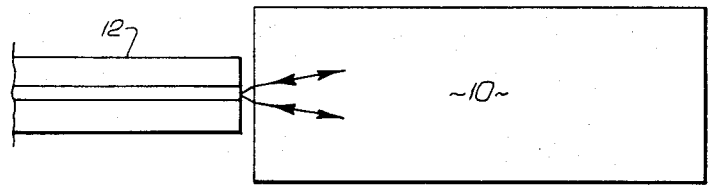
Figure 11:
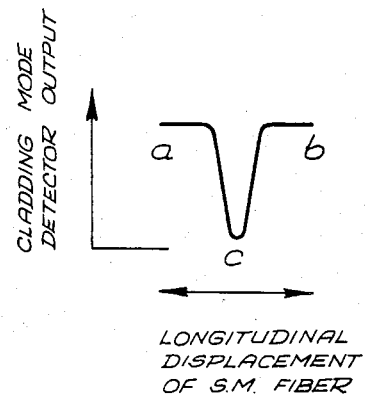
FIG. 11 is a graph showing the output of a detector of light reflected into the cladding of the fiber for various axial displacements of the fiber.

Another possible defect in GRIN lenses is that the focal point may not be exactly at the surface of the lens. This may necessitate axial alignment as well as lateral alignment of the fiber 12 with respect to the lens 10, as shown in FIGS. 10a, 10b and 11. In FIG. 10a, the fiber 12 is too close to the lens 10, and much of the reflected light is launched into the cladding material. In FIG. 10b, the fiber 12 is too far from the lens 10, and some light will still be launched into the cladding material. The optimum axial position shown in FIG. 10c will result in the launching of light principally into the fiber core material, with very little going into the cladding. Thus there will be another local minimum in the detector output, as shown in FIG. 11, when the fiber 12 is optimally aligned with the lens 10 in terms of its axial position.

Figure 12:
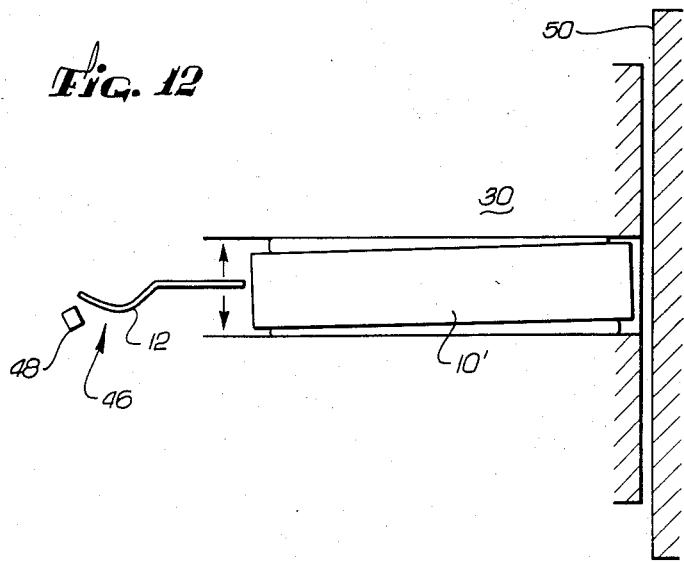
FIG. 12 is a schematic diagram showing an alternative technique for aligning a fiber in a connector having a misaligned GRIN lens.

FIG. 12 illustrates an alternative approach employing the method of the invention. This shows a a GRIN lens 10' that is misaligned in its connector part 30. Instead of grinding and polishing a common reference surface, a temporary reference surface is provided by placing a plane mirror 50 over the connector part 30, and performing fiber alignment by one of the methods already described. This will ensure that light emerging from connector half will be perpendicular to surface of the connector part 30. Consequently, the connector half will be perfectly matched with another one formed by this or the previously described technique.

It will be appreciated from the foregoing that the present invention represents a significant advance in the field of connectors for optical fibers. In particular, the invention provides a new technique for ensuring that connector halves will be matched and aligned, while minimizing connector losses and wastage of parts. It will also be appreciated that, although specific embodiments of the invention have been described in detail for purposes of illustration, various modifications may be made without departing from the spirit and scope of the invention. Accordingly, the invention is not to be limited except as by the appended claims.

Figure 13:
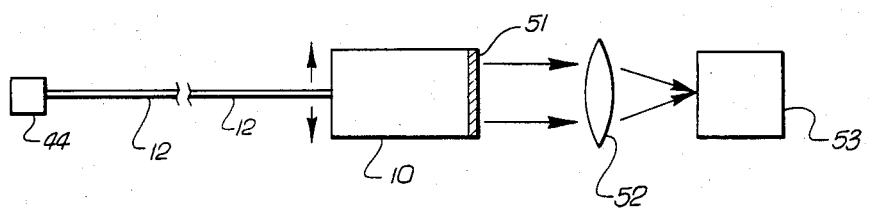
FIGS. 13 and 14 are schematic views illustrating an alternative technique for alignment of a fiber and a GRIN lens assembly.

A method for aligning the fiber not requiring examination of the back-reflected light is shown in FIG. 13. A lens coating 51 is modified so that part of the light is reflected back to the fiber 12, with the remainder being transmitted through a lens 52 to a scanning optical spectrometer or a scanning optical spectrum analyzer, indicated at 53. With the fiber 12 misaligned with the GRIN lens 10, the normal output of the laser is observed. Depending on the laser construction, one or more frequency components of a longitudinal mode will appear at the output of the spectrometer or analyzer 53. When the fiber 12 is properly aligned with respect to the GRIN lens 10 so that the reflected light is fed back to the laser, the output spectral characteristic of the laser will change. The output will become very noisy, with spectral components changing rapidly, or the output optical spectrum will quiet down appreciably from its normal behaviour. The actual change that will be observed depends upon the phase stability of the light fed back to the laser. The observation of a changed optical output spectrum indicates that the fiber 12 is properly aligned with the GRIN rod lens 10.

Figure 14:
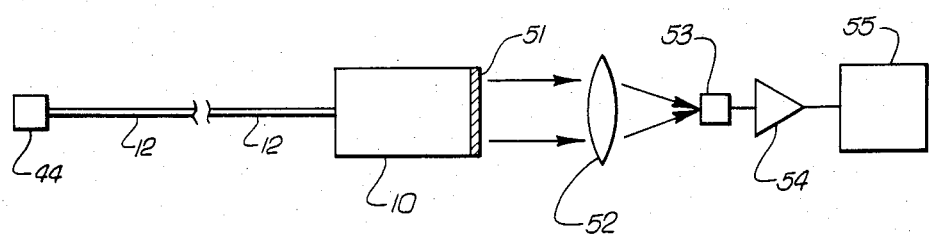

An alternate method for aligning the fiber 12 to the GRIN lens 10 is shown in FIG. 14. The coating 51 reflects part of the light back and transmits the remainder to lens 52 and detector 53. The electrical output of the detector 53 is amplified in an amplifier 54, and then transmitted to an electronic spectrum analyzer 55. The output of the spectrum analyzer 55 will only show the noise frequency spectrum of the laser source 44 and the detector 53 when the fiber 12 is misaligned to the GRIN lens 10. When the fiber 12 is properly aligned so that the light is reflected or fed back to the laser 44, the laser spectral output will deviate from its normal output. The laser output may become noisy and appear in the spectrum analyzer as random noisy frequency components, or it may become less noisy if the light fed back to the laser remains locked in phase with the laser output, i.e., the fiber, the laser facet, and the external reflector may form a temperaturestable, external-coupled cavity to the laser. The deviation of the spectrum from normal will indicate that the fiber is properly aligned with the GRIN lens.

I claim:

1. A method for angular alignment of each a plurality of lens-type optical fiber connectors without the use of a precision-made standard component each connector having a lens at one end for mating with the corresponding lens of another connector, the method comprising performing the following steps for each lens;

securing each lens in a holder with one of its end faces exposed;

forming a common reference plane without regard to the precise orientation of the lens, by grinding and polishing the exposed end face of the lens together with the adjacent surface of the holder; and positioning an optical fiber at the other end face of the lens in such a manner that light rays from the fiber have a perpendicular angle of incidence on the reference plane;

whereby any two connectors will be perfectly angularly aligned if their reference planes are butted together or placed in a parallel relationship.

2. A method as set forth in claim 1, wherein the step of positioning the fiber includes;

coating the reference plane with a reflective material;

launching light into the fiber;

measuring the intensity of light reflected back along the fiber by the reflective coating; and moving the fiber with respect to the lens until the intensity of light found in the measuring step reaches a peak.

3. A method as set forth in claim 2, wherein the step of measuring the intensity of reflected light includes;

forming a bend in the fiber to allow light from cladding material of the fiber to be coupled out of the fiber; and detecting light coupled out of the fiber at the bend, whereby detection of a local minimum in the detected light output is indicative of perfect alignment and launching of most light into the core of the fiber.

4. A method as set forth in claim 3, wherein the step of moving the fiber includes:

moving the fiber laterally with respect to the lens; and moving the fiber axially with respect to the lens, whereby the position of the fiber is optimized in three dimensions.

5. A method as set forth in claim 2, wherein the step of measuring the intensity of reflected light includes:

interposing in the path of the fiber a beam-splitting mirror, to separate the reflected light on its return path through the fiber; and detecting the reflected light separated out by the beam-splitting mirror, whereby the detected light intensity reaches a maximum when the fiber is properly aligned with the lens.

6. A method as set forth in claim 5, wherein the step of moving the fiber includes:

moving the fiber laterally with respect to the lens; and moving the fiber axially with respect to the lens, whereby the position of the fiber is optimized in three dimensions.

7. A method as set forth in claim 1, wherein the step of positioning the fiber includes:

coating the reference plane with a part-reflective material;

launching laser light into the fiber;

receiving light transmitted through the reference plane in a spectral analyzer;

moving the fiber with respect to the lens; and monitoring the spectral content of the light received at the spectral analyzer, to detect a spectral change indicative of perfect alignment of the fiber and lens.

8. A method for angular alignment of each of a plurality of lens-type optical fiber connectors without the use of a precision-made standard component each connector having a lens at one end for mating with the corresponding lens or another connector, the method comprising performing the following steps for each lens:

securing each lens in a holder with one of its end faces exposed, the lens holder having a planar surface for coupling to another holder of the same type, the planar surface being not necessarily precisely oriented with respect to the lens;

forming a temporary reference plane by placing a plane mirror on the planar surface of the lens holder;

positioning an optical fiber at the other end face of the lens in such a manner that light rays from the fiber have a perpendicular angle of incidence on the reference plane; and removing the plane mirror;

whereby any two connectors will be perfectly angularly aligned if the planar surfaces of their lens holders are butted together or placed in a parallel relationship.

9. A method for angular alignment of each of a plurality of lens-type optical fiber connectors without the use of a precision-made standard component each connector having a lens at one end for mating with the corresponding lens or another connector, the method comprising performing the following steps for each lens:

securing each lens in a holder with one of its end faces exposed, the lens holder having a planar end surface for coupling with another holder of the same type, and the end surface being not necessarily precisely oriented with respect to the lens;

forming a reference plane parallel with the planar surface of the lens holder; and positioning an optical fiber at the other end face of the lens, in such a manner that light rays from the fiber have a perpendicular angle of incidence on the reference plane;

whereby any two connectors will be perfectly angularly aligned if the planar surfaces of their lens holders are butted together or placed in a parallel relationship.

10. A method as set forth in claim 9, wherein the step of positioning the fiber includes:

coating the reference plane with a part-reflective material;

launching laser light into the fiber;

receiving light transmitted through the reference plane in a spectral analyzer;

moving the fiber with respect to the lens; and monitoring the spectral content of the light received at the spectral analyzer, to detect a spectral change indicative of perfect alignment of the fiber and lens.

* * * * *